United States Patent
Mueller

[15] 3,683,284
[45] Aug. 8, 1972

[54] PULSE HEIGHT ANALYZER

[72] Inventor: Peter G. Mueller, Guilford, Conn.

[73] Assignee: Picker Corporation, White Plains, N.Y.

[22] Filed: June 25, 1968

[21] Appl. No.: 739,793

[52] U.S. Cl. .................328/117, 307/215, 307/235, 328/147, 328/150
[51] Int. Cl. ..............................................H03k 5/20
[58] Field of Search......328/115, 116, 117, 135, 146, 328/147, 150; 307/235

[56] References Cited

UNITED STATES PATENTS

| | | | |
|---|---|---|---|
| 2,694,146 | 11/1954 | Fairstein | 328/135 UX |
| 2,760,064 | 8/1956 | Bell | 328/117 |
| 3,122,729 | 2/1964 | Bothwell et al. | 328/115 |

OTHER PUBLICATIONS

J. D. Goodell, Journal of Computing Systems 1951, Pages 21 and 22 QA-/-J63.

S. H. Washburn, An Application of Boolean Algebra To The Design of Electronic Switching Circuits, Page 383, 1953.

*Primary Examiner*—Donald D. Forrer
*Assistant Examiner*—L. N. Anagnos
*Attorney*—Watts, Hoffmann, Fisher & Heinke

[57] ABSTRACT

An apparatus for selecting signals of a predetermined amplitude range from signals received from a nuclear energy detector. An input signal produces both lower and upper level signals when the input signal amplitude exceeds a predetermined upper level. The upper and lower level signals selectively actuate a flipflop, which serves as a memory. The lower level signal and output signal of the flipflop energize a gate which provides an output signal only when the amplitude of an input signal lies between the predetermined lower and upper amplitude levels. The gate prevents an output signal when the input has an amplitude greater than the upper level.

14 Claims, 6 Drawing Figures

INVENTOR.
PETER G. MUELLER
BY Watts, Hoffmann, Fisher & Heinke
ATTORNEYS

INVENTOR
PETER G. MUELLER

3,683,284

PULSE HEIGHT ANALYZER

BACKGROUND OF THE INVENTION

1. Field of the Invention

This invention relates to logic circuitry for a pulse height analyzer, which circuitry provides an output signal when an input signal has a maximum amplitude lying between variable predetermined lower and upper amplitude levels, and, more particularly, to such circuitry embodying a memory to prevent an output signal in response to an input signal that exceeds the lower level and then exceeds the upper level before again falling below the lower level.

In detecting measuring and recording nuclear energy it is desired to recognize an output signal from a detector when the signal has a maximum amplitude that exceeds a predetermined lower amplitude level but does not exceed a predetermined upper amplitude level. Typical applications for such recognition occur in detecting equipment where it is necessary to discriminate between transmitted pulses of selected energy levels and relatively low-level noise signals and higher energy transmitted pulses.

2. Description of Prior Art

Various amplitude or pulse height analyzers of the window type are known in the prior art. Typical among these are arrangements which produce a first signal if the input signal amplitude exceeds a predetermined lower level, and produce a second signal if the input signal amplitude exceeds a predetermined upper level. The two signals thus produced are then combined in such a manner that if both signals are present, they cancel each other and no output signal results. If only one signal is present due to the amplitude of the input signal exceeding the lower level but not exceeding the upper level, an output signal is produced.

Such analyzers have proven quite useful when the input signal to the analyzer is essentially a square wave pulse, that is, when the input signal has exceedingly steep leading and trailing edges. That condition rarely occurs in actual practice, however, because of the finite response time required by most transducers that provide the input signal to the analyzing circuitry, and the capacitances inherent in such apparatus that tend to slope the pulse leading and trailing edges.

When an input signal to an analyzer of the type described has finite rise and fall times and an amplitude that exceeds the predetermined upper level, there will be a time at the start of the signal when the amplitude of the signal exceeds the predetermined lower amplitude level but has not yet reached the upper amplitude level. Similarly, at the end of the signal there will be a time when the signal amplitude has fallen below the upper level but has not yet fallen below the lower level. Thus, output signals can be produced by the analyzer at the beginning of such a signal and against the end of such a signal, This, of course, is quite undesirable where the number of output signals produced in a given time is critical or where the signals are used to gate other apparatus.

Other circuits have been proposed to overcome the aforementioned difficulty brought about by finite rise and fall times of an input pulse to the analyzer. These proposed circuits through one means or another, would provide a memory, so that no output is provided until an input signal whose amplitude exceeds the lower level has fallen below the lower level without in the meantime having exceeded the upper level. Such proposed circuits, however, are generally complex and hence expensive to construct.

Accordingly, it is a general object of the present invention to provide a pulse height analyzer that is relatively simple in construction and cost, while embodying a memory to prevent provision of any output signal in response to an input signal that exceeds a lower amplitude level and then exceeds an upper amplitude level.

SUMMARY OF THE INVENTION

The present invention provides a logic circuit using readily-available components for providing an output signal when the maximum amplitude of an input signal lies between variable predetermined limits. No output signal is provided when the maximum amplitude of the input signal lies below the predetermined lower level or when the maximum amplitude of the input signal exceeds the predetermined upper level.

An input signal is applied simultaneously to a lower level comparator and an upper level comparator. The comparators are respectively biased to respond to input signals whose amplitudes exceed a predetermined lower amplitude level and a predetermined upper amplitude level. Any signal whose amplitude exceeds the upper level will provide outputs from the lower level and upper level comparators. Output signals from the lower level and upper level comparators are respectively provided to two inputs of a bi-stable multivibrator or flipflop. An output signal from the flipflop is provided as one input to an output gate. A second input to the output gate is provided directly from the output of the lower level comparator. The output gate provides an output signal only when the amplitude of the input pulse has fallen from above to below the predetermined lower amplitude level, and only when the upper amplitude level has not been exceeded by the amplitude of the input pulse after the input pulse amplitude first exceeded the lower level. Thus, due to the flipflop, the logic circuitry of the invention includes a memory that prevents output signals from occurring due to an input signal having sloping leading and trailing edges that cause the signal amplitude to sequentially exceed the lower level, exceed the upper level, decrease below the upper level, and finally decrease below the lower level.

DESCRIPTION OF THE PREFERRED EMBODIMENT

The signal output of the circuitry of the invention is binary in nature. In other words, an output signal is provided if the maximum amplitude of an input signal to the circuit lies between certain predetermined amplitude levels. The output signal of the circuit is not proportional in amplitude to the amplitude of the input signal, but only indicates that an input signal has been present whose maximum amplitude lies between those predetermined upper and lower amplitude levels. Because of this particular feature, the components comprising the circuitry may be conventional, readily-available types that do not require special design or the use of expensive circuit elements.

Figure 1:
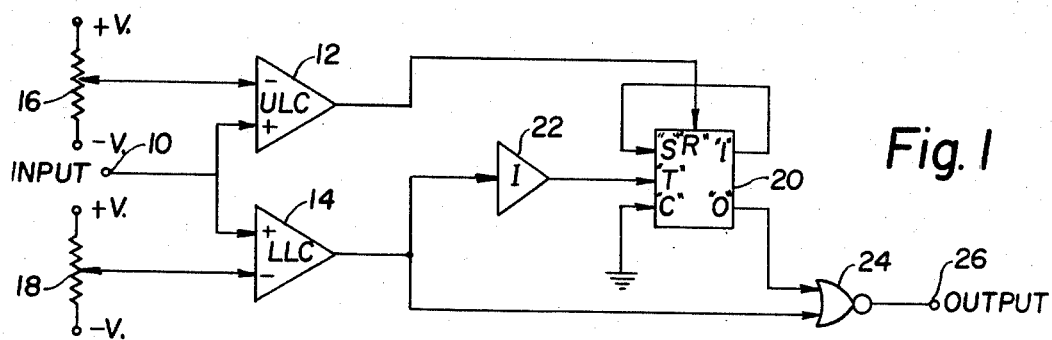
FIG. 1 is a block diagram of a circuit constructed in accordance with the invention.

In the embodiment shown in FIG. 1, a signal is understood to be present if the output of a component is "high" or H, and no signal is present if the output is "low" or L. In the embodiment shown in FIG. 3, the converse is true.

As shown in FIG. 1, an input signal is provided from a scintillation probe or other device (not shown) to an input terminal 10. The signal is transmitted to one input (non-inverting) of an upper level comparator 12 and to one input (non-inverting) of a lower level comparator 14. A second input (inverting) to the upper level comparator 12 is supplied from a movable arm of a potentiometer 16, which is connected between positive and negative sources of potential (not shown). The position of a movable arm of the potentiometer 16 provides a predetermined and variable bias potential to the upper limited comparator 12 that sets the upper amplitude level. An input signal below the upper amplitude level will not cause an output signal from the comparator 12. If the input signal exceeds the upper amplitude level, it will cause an output signal to be provided from the comparator 12. In other words, the output of the comparator 12 will go high if the input signal amplitude exceeds the upper amplitude level.

Similarly, a second input of the lower level comparator 14 is provided from a movable arm of a potentiometer 18 which is connected between the positive and negative sources of potential. The position of the movable arm of the potentiometer 18 determines the lower amplitude level for the comparator 14. An input signal below this level will produce no output signal from the comparator while an input signal above this level will produce an output signal. That is, the output of the comparator 14 goes high when the input signal amplitude exceeds the lower amplitude level.

The output of the upper level comparator 12 is connected directly to one input of a bistable multivibrator or flipflop 20. The output of the lower level comparator 14 is connected through an inverter 22 to a second input of the flipflop 20.

Various devices may be used for the upper and lower level comparators 12, 14. A suitable differential voltage comparator is known as Model $\mu$A710 or Model $\mu$A710C, manufactured and sold by Fairchild Semiconductor Division of Fairchild Camera and Instrument Corporation, Mountain View, California. Alternatively, the comparators 12, 14 may comprise Schmitt trigger circuits or other similar circuits, which will produce an output signal when an input signal amplitude exceeds a predetermined amplitude level.

The inverter 22 may be a conventional, commercially available inverter. Alternatively, the inverter 22 may comprise a conventional NOR gate, having one input grounded, a suitable NOR gate being known as Model $\mu$L914, manufactured and sold by the mentioned Fairchild Semiconductor Division. The latter alternative may be preferable because of commercial availability, or for cost or other reasons. In any event, when the input from the comparator 14 is low, the output from the inverter 22 is high, and vice versa.

The flipflop 20 may be of a type designed for use in shift registers and binary counting applications. One is identified as Model $\mu$L 923 and is manufactured and sold by the mentioned Fairchild Semiconductor Division. The flipflop 20 has several unique characteristics, which are important to the function of the circuitry of the present invention. The flipflop 20 is provided with two output terminals, which are designated as "0" and "1". It also has input terminals designated as "R" (reset), "S" (set) and "T"(toggle), and a terminal "C" (clear), which is grounded in this particular application.

As shown, the "1" output terminal of the flipflop 20 is connected to the "S" input terminal. The "0" output terminal provides the output signal from the flipflop to one input of a NOR gate 24. The output signal from the upper level comparator 12 is supplied to the "R" input terminal of the flipflop, and the output signal from the inverter 22 is supplied to the "T" input terminal of the flipflop.

As previously noted, the flipflop 20, both in its construction and connections, embodies several features that are of importance to the invention. First, because of the interconnection of the "1" and "S" terminals, the "S" terminal will always be low when the "0" terminal is high, and vice versa. Second, whenever the "R" terminal is high, the "0" terminal will be high. Third, whenever the "T" input terminal is switched from low to high, the "0" output terminal will remain in its previous condition whether it be high or low. Fourth, whenever the input to the "T" input terminal goes from high to low, the output terminal "0" switches from high to low or, if it has been low, it remains low. The "1" output is always the inverse of the "0" output.

As previously noted, one input to the NOR gate 24 is from the "0" output terminal of the flipflop 20. A second input to the NOR gate 24 is directly from the output of the lower level comparator 14. The NOR gate 24 is of conventional design. A suitable NOR gate is known as Model $\mu$L914 and is manufactured and sold by the aforementioned Fairchild Semiconductor Division. As is well-known, a NOR gate comprises an OR gate followed by an inverter. Its operation is such that if both of its input signals are low, its output is high; if one of its input signals is high, its output is low, and, if both of its input signals are high, its output is low. The output from the NOR gate 24 is provided to an output terminal 26 that may be connected to suitable recording equipment or other apparatus (not shown).

Figure 2A:
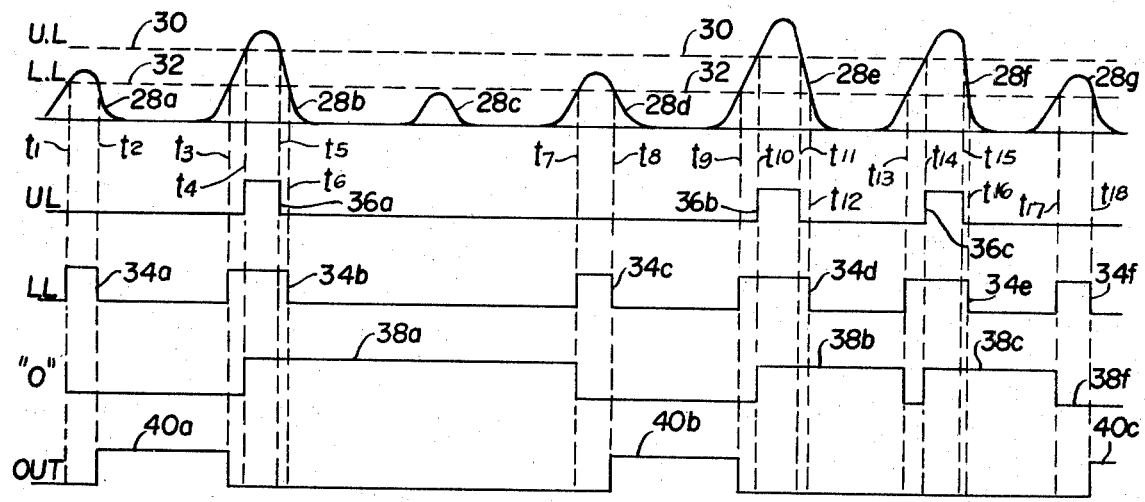
FIGS. 2(a) and (b) show wave forms illustrating the operation of the circuit of FIG. 1 in response to various sequences of input pulses.
Figure 2B:
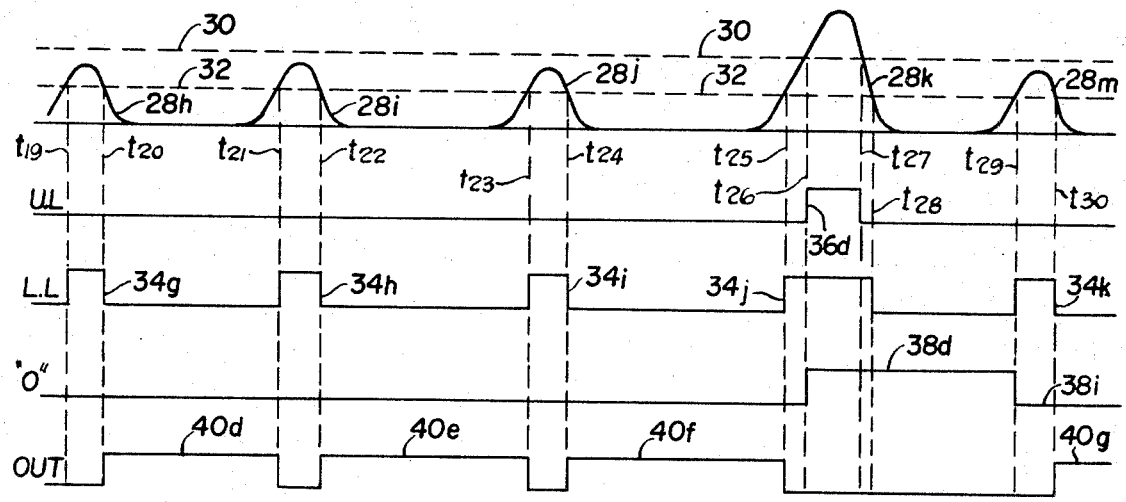

The operation of the circuitry of FIG. 1 can best be understood by consideration of Table I taken in conjunction with FIGS. 2(a) and 2(b).

TABLE I

| Time | OUTPUT Cl 4 | C12"T" | F | F 20 "R" | "O" | NOR gate 24 from 20 | from 14 | out |
|---|---|---|---|---|---|---|---|---|
| At$_{t_1}$ | H | L | L | L | L | L | H | L |
| t$_2$ | L | L | H | L | L | L | L | H |
| t$_3$ | H | L | L | L | L | L | H | L |
| t$_4$ | H | H | L | H | H | H | H | L |

| | | | | | | | | |
|---|---|---|---|---|---|---|---|---|
| $t_5$ | H | L | L | L | H | H | H | L |
| $t_6$ | L | L | H | L | H | H | L | L |
| $t_7$ | H | L | L | L | L | L | H | L |
| $t_8$ | L | L | H | L | L | L | L | H |
| $t_9$ | H | L | L | L | L | L | L | L |
| $t_{10}$ | H | H | L | H | H | H | H | L |
| $t_{11}$ | H | L | L | L | H | H | H | L |
| $t_{12}$ | L | L | H | L | H | H | L | L |
| $t_{13}$ | H | L | L | L | L | L | H | L |
| $t_{14}$ | H | H | L | H | H | H | H | L |
| $t_{15}$ | H | L | L | L | H | H | H | L |
| $t_{16}$ | L | L | H | L | H | H | L | L |
| $t_{17}$ | H | L | L | L | L | L | H | L |
| $t_{18}$ | L | L | H | L | L | L | L | H |
| $t_{19}$ | H | L | L | L | L | L | H | L |
| $t_{20}$ | L | L | H | L | L | L | L | H |
| $t_{21}$ | H | L | L | L | L | L | H | L |
| $t_{22}$ | L | L | H | L | L | L | L | H |
| $t_{23}$ | H | L | L | L | L | L | H | L |
| $t_{24}$ | L | L | H | L | L | L | L | H |
| $t_{25}$ | H | L | L | L | L | L | H | L |
| $t_{26}$ | H | H | L | H | H | H | H | L |
| $t_{27}$ | H | L | L | L | H | H | H | L |
| $t_{28}$ | L | L | H | L | H | H | L | L |
| $t_{29}$ | H | L | L | L | L | L | H | L |
| $t_{30}$ | L | L | H | L | L | L | L | H |

The table illustrates the conditions in terms of high and low (H and L) characteristics of various input and output points in the circuit in response to various input signals. The table illustrates the conditions prevailing at and after times $t_1$–$t_{30}$, which are also shown in FIGS. 2(a) and 2(b) as those times at which the amplitudes of input signals 28a–28m increase above or decrease below upper and lower levels respectively indicated by numerals 30, 32. When input signals 28a–28m have amplitudes that exceed the lower level 32, the lower level comparator 14 produces high (H) output signals 34a–34k, and when the upper level 30 is exceeded, the upper level comparator 12 produces high output signals 36a–36d. The high output signals on the "0" output terminal of the flipflop 20, which are provided as one input to the NOR gate 24, are designated as 38a–38d. The high output signals of the NOR gate supplied to the output terminal 26 are designated by the numerals 40a–40g.

As shown in FIG. 2(a), an input signal 28a having an amplitude that exceeds the lower level 32 produces a high output signal 34a from the lower level comparator 14 between times $t_1$ and $t_2$, when the amplitude of the input signal 28a exceeds the lower level. The signal 34a is inverted and applied to the "T" input of the flipflop 20. This causes the "0" output of the flipflop 20 to go to or to remain in the low condition. This low output signal from the flipflop 20 and the high output signal from the lower level comparator 14 supplied to the NOR gate 24 cause the NOR gate to provide a low output until time $t_2$. At time $t_2$, the output of the lower level comparator 14 goes low, thus terminating the pulse 34a. The "0" output of the flipflop 20 to the NOR gate 24 remains low, but the second input to the NOR gate from the comparator 14 goes from high to low. This causes the output of the NOR gate 24 to go from low to high as indicated by the leading edge of the pulse 40a shown in FIG. 2(a).

The output of the NOR gate 24 remains high until time $t_3$, when the pulse 28b causes the output of the lower level comparator 14 to go high, as shown by the leading edge of the pulse 34b. This causes the output of the NOR gate 24 to go low and terminates the pulse 40a at time $t_3$. When the input pulse amplitude exceeds the upper level 30, as shown at time $t_4$, the pulse 36a is produced by the upper level comparator 12 and provided to the "R" input terminal of the flipflop 20. This causes the "0" output to go high, as shown by the leading edge of the pulse 38a. The two high inputs to the gate 24 cause its output to remain low. At time $t_6$, the pulse 34b ends. This provides a low input to the gate 24, which along with the high input from the flipflop, causes the output of the gate to remain low.

Between the times $t_6$ and $t_7$, the input pulse 28c occurs. Because its amplitude does not exceed the lower level 32, conditions of the circuit remain static.

At time $t_7$, the input pulse 28d rises above the lower level 32 and the positive output pulse from the lower level comparator 14 provided to the "T" input of the flipflop as a negative pulse causes the "0" output of the flipflop 20 to go low. At this time, the output of the NOR gate 24 remains low, but the circuit is now prepared to change its state in response to termination of the output pulse 34c from the lower level comparator 14, if it next occurs. When that termination occurs at time $t_3$, the output of the flipflop 20 remains low, so that both inputs to the NOR gate 24 are low. This causes the output of the NOR gate 24 to go high as shown by the pulse 40b. The output of the NOR gate 24 will remain high until an input pulse has an amplitude sufficient to again provide an output pulse from the lower level comparator 14. This occurs at time $t_9$ when the input pulse 28e has an amplitude that exceeds the lower level 32 to provide the pulse 34d. At that time, the output from the flipflop 20 to the NOR gate 24 remains low, but the output from the comparator 14 goes high. This causes the output of the gate 24 to go low and terminates the output pulse 40b.

At time $t_{10}$, the amplitude of the pulse 28e exceeds the upper level 30 and provides an output pulse 36b from the upper level comparator 12. The output of the flipflop 20 goes high. This results in two high input signals being provided to the gate 24, thus resulting in continuation of the low output. At time $t_{11}$, the signal 36b from the comparator 12 goes low, which causes no change in the output. At time $t_{12}$, the output of the low level comparator 14 changes from high to low, thus changing one of the input signals to the NOR gate 24 from high to low. The output of the gate 24 remains low, however.

The action of the circuitry in response to the input pulse 28f is similar to that just described with respect to the input pulse 28e, except that at time $t_{13}$ the pulse 34e causes the "0" output to go low. The input pulse at 28g causes the output of the low level comparator 14 to go high, as shown by the pulse 34f. This changes the state of the flipflop 20 and causes its output to go low. Thus, when the output pulse 34f from the comparator 14 ceases at time $t_{18}$, two low inputs are provided to the NOR gate 24, which results in providing a high output from the gate, as shown by the leading edge of the pulse 40c.

FIG. 2(b) illustrates the various conditions that exist in the circuitry in response to a sequence of input pulses whose maximum amplitudes fall within the window between the levels 30, 32. When the input pulse 28h rises above the lower level 32 at time $t_{19}$, the output of the lower level comparator 14 goes high, as shown by the pulse 34g. This causes the "0" output of the flipflop 20 to change to or to remain in its low condition. Thus, a high input and a low input are provided to the NOR gate 24, causing it to produce a low output. At time $t_{20}$, the output of the lower level comparator 14 goes low. The state of the flipflop 20 remains unchanged, thus providing two low input signals to the NOR gate 24. This results in the provision of a high output signal 40$d$ from the gate 24. The output of the flipflop 20 remains low until an input signal has exceeded the upper level 30. This does not occur until time $t_{26}$. Thus, as positive output pulses are produced by the lower level discriminator 14, from times $t_{21}$ to $t_{22}$ and from $t_{23}$ to $t_{24}$, the output of the NOR gate 24 goes low in response to those pulses 34$h$, 34$i$. This produces a series of positive pulses 40$d$, 40$e$, 40$f$ at the output of the gate 24 in response to the input signals 28$h$, 28$i$, 28$j$, respectively.

When a positive output pulse 34$j$ is produced by the comparator 14 at time $t_{25}$ in response to the input signal 28$k$, one input to the NOR gate 24 goes high, thus causing the output of the NOR gate to go low. When at time $t_{26}$ a positive pulse 36$d$ is produced by the upper level comparator 12, the output of the flipflop 20 goes high. This provides two high inputs to the NOR gate 24 and results in a low output from the gate. At time $t_{27}$, the pulse 36$d$ terminates, which causes no change in the output. At time $t_{28}$, the pulse 34$j$ from the lower level comparator 14 terminates, which causes one input to the gate 24 to go low. Thus, the output of the gate 24 remains low.

At time $t_{29}$, the output of the comparator 14 goes high, which results in a low and a high signal being provided to the NOR gate 24 and causes it to continue to provide a low output signal. When the pulse 34$k$ terminates at time $t_{30}$, the input to the NOR gate 24 from the lower level comparator 14 goes low, thus providing a high output signal 40$g$ from the gate in response to its two low input signals.

Summarizing briefly, the NOR gate 24 would provide a high output signal in response to a low signal from the lower level comparator 14, except that the output of the flipflop 20 inhibits provision of the output signal from the gate 24 as a result of a particular sequence of input signal amplitudes. That sequence occurs when the amplitude of the input signal exceeds the predetermined lower amplitude level, and then exceeds the predetermined upper amplitude level without having fallen below the lower level in the meantime. In other words, the high output of the flipflop 20 inhibits provision of a high output signal from the NOR gate 24 at the termination of a signal from the lower level comparator 14, when a high output signal has been provided from the upper level comparator 12 during provision of the high signal from the comparator 14.

Figure 3:
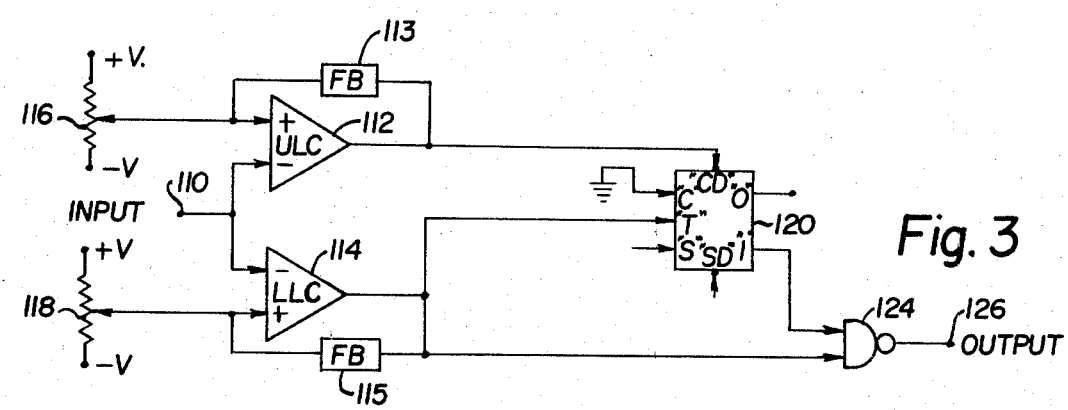
FIG. 3 is a block diagram of another circuit embodying the invention.

FIGS. 3 and 4 illustrate the arrangement and operation of a second embodiment of the invention that differs in several ways from the embodiment shown and described in connection with FIGS. 1 and 2. The differences in the two embodiments are based primarily on the fact that different types of bistable multivibrators or flipflop are used in the two embodiments. This requires a difference in the polarities of the output signals obtained from the comparators in the two embodiments, and different types of output gates to combine the output signals of the lower level comparator and the flipflop.

Elements in the embodiment of FIG. 3 that correspond to those in the embodiment of FIG. 1 are designated by the same reference numerals, but in the "100" series rather than in the "10" series. Wave forms shown in FIG. 4 that correspond to those shown in FIG. 2 are similarly designated.

As shown in FIG. 3, an input signal provided to an input terminal 110 is supplied to inverting inputs of an upper level comparator 112 and a lower level comparator 114. The comparators 112 and 114 may be identical to the comparators previously described with reference to FIG. 1. A comparison signal to a non-inverting input of the upper level comparator 112 is provided from the movable arm of a potentiometer 116, and a comparison signal is similarly supplied from the movable arm of a potentiometer 118 to a non-inverting input of the lower level comparator 114. The potentiometers 116, 118 are each connected between positive and negative sources of potential (not shown) in conventional manner. The upper level and lower level comparators 112, 114 may respectively be provided with feedback devices 113, 115 such as resistors or capacitors, to achieve a minimum output pulse width. However, this feedback feature is entirely optional and may or may not be used.

Because of the particular connections to the inverting and non-inverting inputs of the comparators 112, 114, the comparators provide high output signals when the input signals from the terminal 110 are below their respective predetermined upper and lower amplitude levels, the amplitude levels being determined by the settings of the potentiometers 116, 118, and provide low output signals when those predetermined upper and lower amplitude levels are exceeded. It is noted that these output signals are the opposite in polarity of those provided from the upper and lower level comparators 12, 14 of the embodiment shown in FIG. 1.

The output of the upper level comparator 112 is connected to one input of a bistable multivibrator or flipflop 120, and the output of the lower level comparator 114 is connected to a second input of that flipflop. The flipflop 120 may conveniently be a diode-transistor micrologic element of a type designed for computor applications. A suitable such element is known as Model MD μL 945, and is manufactured and sold by the mentioned Fairchild Semiconductor Division. The flipflop 120 has output terminals designated as "0" and "1", and input terminals designated as "CD"(direct clear), "C"(clear), "T"(toggle), "S"(set), and "SD" (direct set). The output of the upper level comparator 112 is connected to the "CD" input terminal, and the output of the lower level comparator 114 is connected to the "T" input terminal. The "C" terminal is grounded, and the "S", "SD", and "0" terminals are unused. The "1" output terminal is connected as one input to a NAND gate 124, another input of which is supplied from the lower level comparator 114.

The flipflop 120 possesses several features that are important to the operation of the invention shown in FIG. 3. One feature is that the polarity of the "1" output terminal normally follows that of the "CD" input terminal, except in one specific case. That case is that, when the "1" output terminal has gone low in response to the "CD" input terminal going low, the "1" output terminal stays low until the "T" input terminal goes from high to low. When the "T" input terminal makes that transition from high to low, the "1" output terminal will go high, assuming that at that time the "CD"

input terminal is high. Another feature is that, if the "1" output has been high, it will remain high. These features, in effect, provide a memory for the circuit.

The NAND gate 124, whose two inputs are respectively connected to the "1" output terminal of the flipflop 120 and to the output of the lower level comparator 114, is of conventional design. A suitable NAND gate is known as Model μL 930, and is manufactured and sold by the mentioned Fairchild Semiconductor Division. Actually, the model μL 930 circuitry comprises four NAND circuits packaged together, only one of which need be used in the present application. The NAND gate 124 is characterized in that if both of its inputs are high, its output will be low. At all other times its output will be high. As is well-known, a NAND gate comprises an AND gate followed by an inverter. The output from the NAND gate is provided to an output terminal 126.

Figure 4A:
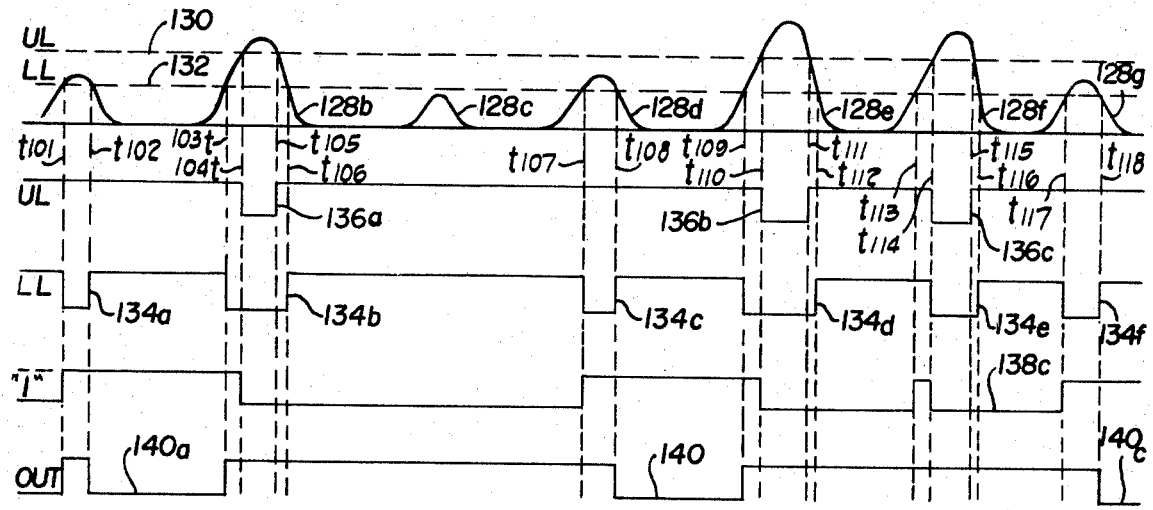
FIGS. 4(a) and (b) are wave forms illustrating the operation of the circuit of FIG. 3.
Figure 4B:
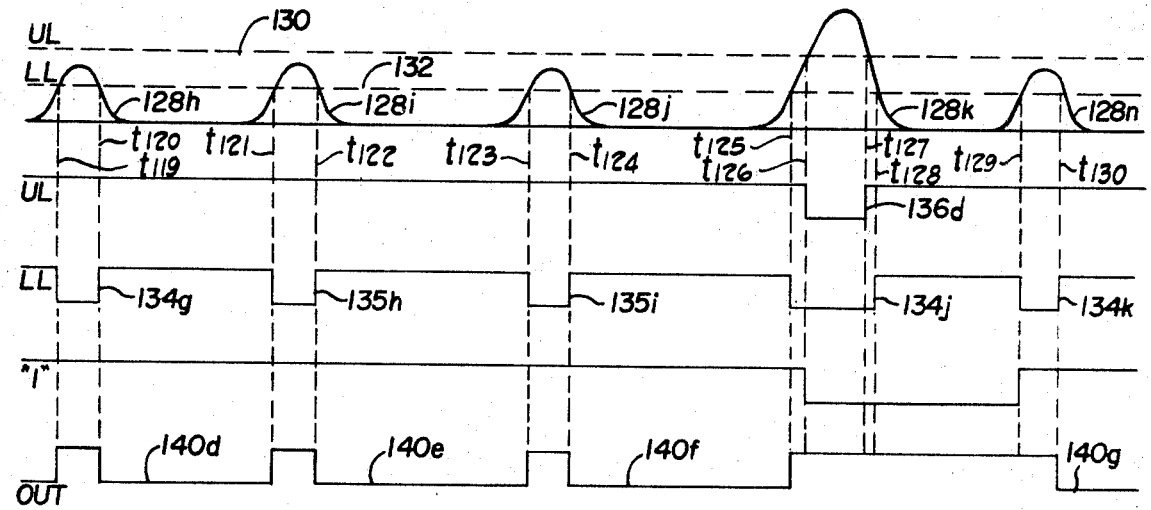

The operation of the circuitry of FIG. 3 is illustrated in Table II and in FIGS. 4(a) and 4(b).

TABLE II

| Output time | C 114 | C 112 | FF 120 "CD" | "T" | "I" | NAND gate 124 from 120 | from 114 | Out |
|---|---|---|---|---|---|---|---|---|
| At $t_{101}$ | L | H | H | L | H | H | L | H |
| $t_{102}$ | H | H | H | H | H | H | H | L |
| $t_{103}$ | L | H | H | L | H | H | L | H |
| $t_{104}$ | L | L | L | L | L | L | L | H |
| $t_{105}$ | L | H | H | L | L | L | L | H |
| $t_{106}$ | H | H | H | H | L | L | H | H |
| $t_{107}$ | L | H | H | L | H | H | L | H |
| $t_{108}$ | H | H | H | H | H | H | H | L |
| $t_{109}$ | L | H | H | L | H | H | L | H |
| $t_{110}$ | L | L | L | L | L | L | L | H |
| $t_{111}$ | L | H | H | L | L | L | L | H |
| $t_{112}$ | H | H | H | H | L | L | H | H |
| $t_{113}$ | L | H | H | L | H | L | L | H |
| $t_{114}$ | L | L | L | L | L | L | L | H |
| $t_{115}$ | L | H | H | L | L | L | L | H |
| $t_{116}$ | H | H | H | H | L | L | H | H |
| $t_{117}$ | L | H | H | L | H | H | L | H |
| $t_{118}$ | H | H | H | H | H | H | H | L |
| $t_{119}$ | L | H | H | L | H | H | L | H |
| $t_{120}$ | H | H | H | H | H | H | H | L |
| $t_{121}$ | L | H | H | H | H | H | L | H |
| $t_{122}$ | H | H | H | H | H | H | H | L |
| $t_{123}$ | L | H | H | L | H | H | L | H |
| $t_{124}$ | H | H | H | H | H | H | H | L |
| $t_{125}$ | L | H | H | L | H | H | L | H |
| $t_{126}$ | L | L | L | L | L | L | L | H |
| $t_{127}$ | L | H | H | L | L | L | L | H |
| $t_{128}$ | H | H | H | H | L | L | H | H |
| $t_{129}$ | L | H | H | L | H | H | L | H |
| $t_{130}$ | H | H | H | H | H | H | H | L |

Table II illustrates the conditions in terms of high and low (H and L) characteristics of various input and output points in the circuit in response to various input signals. The table illustrates the conditions prevailing at and after times $t_{101}-t_{130}$, which are also shown in FIGS. 4(a) and 4(b) as those times at which the amplitudes of input signals 128a–128m increase above or decrease below upper and lower levels respectively indicated by numerals 130, 132. When the input signals 128a–128m which correspond to the signals 28a–28m in FIG. 2, have amplitudes that exceed the lower level 132, the lower level comparator 14 produces low (L) output signals 134a–134k. When the upper level 130 is exceeded, the upper level comparator 112 produces low output signals 131a–136d. The low output signals on the "1" output terminal of the flipflop 120, which are provided as one input to the NAND gate 124, are designated as 138a–138d. The low output signals of the NAND gate supplied to the output terminal 126 are designated by the numerals 140a–140g. In this embodiment, a transition of the output of the gate 124 from high to low characterizes an output signal, as opposed to an opposite transition in the embodiment of FIG. 1.

As shown in FIG. 4(a), an input signal 128a having an amplitude that exceeds the lower level 132 produces a low output signal 134a from the lower level comparator 114 between times $t_{101}$ and $t_{102}$, when the amplitude of the input signal 128a exceeds the lower level. The signal 134a is applied to the "T" input of the flipflop 120. This causes the "1" output of the flipflop 120 to go to or remain in the high condition. This high output signal from the flipflop 120 and the low output signal from the lower level comparator 114 supplied to the NAND gate 124 cause the NAND gate to provide a high output until time $t_{102}$. At time $t_{102}$, the output of the lower level comparator 114 goes high, thus terminating the pulse 134a. The "1" output of the flipflop 120 to the NAND gate 124 remains high, but the second input to the NAND gate from the comparator 114 goes from low to high. This causes the output of the NAND gate 124 to go from high to low, as indicated by the leading edge of the pulse 140a shown in FIG. 4(a).

The output of the NAND gate 124 remains low until time $t_{103}$, when the pulse 128b causes the output of the lower level comparator 114 to go low, as shown by the leading edge of the pulse 134b. This causes the output of the NAND gate 124 to go high and terminates the low output pulse 140a at time $t_{103}$. When the input pulse amplitude exceeds the upper level 130, as shown at time $t_{104}$, the pulse 136a is produced by the upper level comparator 112 and provided to the "CD" input terminal of the flipflop 120. This causes the "1" output to go low, as shown by the leading edge of the pulse 138a. The two low inputs to the gate 124 cause its output to remain high. At time $t_{106}$, the pulse 134b ends. This provides a high input to the gate 124, which along with the low input from the flipflop causes the output of the gate to remain high.

Because the amplitude of the input pulse 128c does not exceed the lower level 132, conditions of the circuit remain static between times $t_{106}$ and $t_{107}$.

At time $t_{107}$, the input pulse 128d rises above the lower level 132 and the negative output pulse 134c from the lower level comparator 114 provided to the "T" input of the flipflop causes the "1" output of the flipflop 120 to go high. At this time, the output of the NAND gate 124 remains high. The circuit is now prepared to change its output state in response to termination of the output pulse 134c from the lower level comparator 114, if it next occurs. When that termination occurs at time $t_{108}$, the output of the flipflop 120 remains high, so that both inputs to the NAND gate 124 are high. This causes the output of the gate 124 to go low, as shown by the pulse 140b. The output of the gate 124 will remain low until an input pulse has an amplitude sufficient to again provide an output pulse from the lower level comparator 114. This occurs at time $t_{109}$ when the input pulse 128e has an amplitude that exceeds the lower level 132 to provide the pulse 134d. At that time, the output from the flipflop 120 to the NAND gate 124 remains high, but the output from the comparator 114 goes low. This causes the output of the gate 124 to go high and terminates the low output pulse 140b.

At time $t_{110}$, the amplitude of the pulse 128e exceeds the upper level 130 and provides an output pulse 136b from the upper level comparator 112. The output of the flipflop 120 goes low. This results in two low input signals being provided to the gate 124, thus resulting in continuation of the high output. At time $t_{111}$, the signal 136b from the comparator 112 goes high, which causes no change in the output. At time $t_{112}$, the output of the low level comparator 114 changes from low to high, thus changing one of the input signals to the NAND gate 124 from low to high. The output of the gate 124 remains high, however.

The action of the circuitry in response to the input pulse 128f is similar to that just described with respect to the input pulse 128e, except that at time $t_{113}$ the pulse 134e causes the "1" output to go high. The input pulse at 128g causes the output of the low level comparator 114 to go low, as shown by the pulse 134f. This changes the state of the flipflop 120 and causes its output to go high. Thus, when the output pulse 134f from the comparator 114 ceases at time $t_{118}$, two high inputs are provided to the gate 124, which results in providing a low output from the gate, as shown by the leading edge of the pulse 140c.

FIG. 4(b) illustrates the various conditions that exist in the circuitry in response to a sequence of input pulses whose maximum amplitudes fall within the window between the levels 130, 132. When the input pulse 128h rises above the lower level 132 at time $t_{119}$, the output of the lower level comparator 114 goes low, as shown by the pulse 134g. This causes the "1" output of the flipflop 120 to change to or to remain in its high condition. Thus, a high input and a low input are provided to the NAND gate 124, causing it to produce a high output. At time $t_{120}$, the output of the lower level comparator 114 goes high. The state of the flipflop 120 remains unchanged, thus providing two high input signals to the NAND gate 124. This results in the provision of a low output signal 140d from the gate 124. The output of the flipflop 120 remains high until an input signal has exceeded the upper level 130. This does not occur until time $t_{126}$. Thus, as negative output pulses are produced by the lower level discriminator 114, from times $t_{121}$ to $t_{122}$ and from $t_{123}$ to $t_{124}$, the output of the NAND gate 124 goes high in response to those pulses 134h, 134i. This produces a series of negative pulses 140d, 140e, 140f at the output of the gate 124 in response to he input signals 128h, 128i, 128j, respectively.

When a negative output pulse 134j is produced by the comparator 114 at time $t_{125}$ in response to the input signal 128k, one input to the NAND gate 124 goes low, thus causing the output of the gate to go high. When at time $t_{126}$ a negative pulse 136d is produced by the upper level comparator 112, the output of the flipflop 120 goes low. This provides two low inputs to the gate 124 and results in a high output from the gate. At time $t_{127}$, the pulse 136d terminates, which causes no change in the output. At time $t_{128}$, the pulse 134j from the lower level comparator 114 terminates, which causes one input to the gate 124 to go high. Still, the output of the gate 124 remains high.

At time $t_{129}$, the output of the comparator 114 goes low, which results in a low and a high signal being provided to the NAND gate 124 and causes it to continue to provide a high output signal. When the pulse 134k terminates at time $t_{130}$, the input to the NAND gate 124 from the lower level comparator 114 goes high, thus providing a low output signal 40g from the gate in response to its two high input signals.

In the embodiment shown in FIG. 3, the NAND gate 124 would provide a low output signal in response to a high signal from the lower level comparator 114, except that the output of the flipflop 120 inhibits provision of the output signal from the gate 124 as a result of a particular sequence of input signal amplitudes. That sequence occurs when the amplitude of the input signal exceeds the predetermined lower amplitude level, and then exceeds the predetermined upper amplitude level without having fallen below the lower level in the meantime. In other words, the low output of the flipflop 120 inhibits provision of a low output signal from the NAND gate 124 at the termination of a signal from the lower level comparator 114, when a low output signal has been provided from the upper level comparator 112 during provision of the low signal from the comparator 114.

The basic concepts of the two embodiments shown and described are identical, in that bi-stable multivibrators embodying "toggle" or "trigger" features provide short-term memories to inhibit provision of analyzer output signals when input signals exceed an upper amplitude level. It is now apparent that the invention provides logic circuitry which fulfills the general objective previously set forth. It comprises conventional, readily obtainable components that may be of the type known as integrated circuits. Such circuits provide minimum maintenance and long life. While two specific embodiments of the invention have been illustrated and described, it is apparent that many changes may be made by one skilled in the art without departing from the true scope and spirit of the invention.

I claim:

1. A pulse height analyzer for providing an output pulse signal in response to an input signal having a maximum amplitude between predetermined lower and upper amplitude levels, the circuit comprising:
   a. first and second means responsive to said input signal for respectively providing first and second output control signals when said input signal amplitude exceeds said lower and upper levels, respectively;
   b. bistable means responsive to said first and second output control signals for providing a third output control signal normally being of a first level, changing to a second level upon receipt of both a first control signal and a second control signal, and returning to a first level upon the receipt of a succeeding first control signal; and
   c. gate means responsive to the receipt of a said first control signal and a said third control signal for normally developing a said output pulse signal of a first level and for developing an output pulse signal of a second level during a time interval commencing after the receipt of a said first control signal when a said third control signal is of a first level.

2. The analyzer of claim 1, wherein said gate means includes first circuit means, for after the receipt of a said first output control signal, providing a said output signal, and second circuit means responsive to said third output control signal of a second level to inhibit a said output signal.

3. The analyzer of claim 2, wherein said first and second means respectively comprise first and second signal amplitude comparator means.

4. The analyzer of claim 3, further including variable means for biasing said first and second comparator means to determine said lower and upper levels.

5. The analyzer of claim 2, wherein said gate means comprises an OR gate.

6. The analyzer of claim 2, wherein said gate means comprises an AND gate.

7. The analyzer of claim 1, wherein said first and second means respectively comprise first and second signal amplitude comparator means.

8. The analyzer of claim 7, further including variable means for biasing said first and second comparator means to determine said lower and upper levels.

9. The analyzer of claim 1, wherein said gate means comprises an AND gate.

10. A pulse height analyzer for providing an output signal in response to an input signal, having a maximum amplitude lying between predetermined lower and upper amplitude levels, the circuit comprising:
   a. first and second comparator means responsive to said input signal for respectively providing first and second output control signals of a first binary level when said input signal amplitude exceeds said lower and upper levels, respectively;
   b. gate means for receiving two input signals, providing an output signal of a second binary level when at least one of said input signals is of said first level, and providing an output signal of said first level when both of said input signals are of said second level;
   c. first circuit means for applying a said first output control signal to said gate means;
   d. bistable means responsive to said first and second output control signals for providing a third output control signal, said third output control signal normally being of said second level when said first input control signal changes from said first level to said second level, said third output control signal being prevented from changing to said second level in response to said first output control signal changing to said second level by said second output control signal changing to said first level and then to said second level while said first output control signal is of said first level; and
   e. second circuit means for applying a said third output control signal to said gate means.

11. The analyzer of claim 10, wherein said gate means comprises an OR gate.

12. The analyzer of claim 10, wherein said gate means comprises an AND gate.

13. A pulse height analyzer for providing an output signal in response to an input signal having a maximum amplitude lying between predetermined lower and upper amplitude levels, the circuit comprising:
   a. first and second comparator means responsive to said input signal for respectively providing first and second output control signals that are high when said input signal amplitude exceeds said lower and upper levels, respectively;
   b. a NOR gate for receiving two input signals, providing a low output signal when at least one of said input signals is high, and providing a high output signal when both of said input signals are low;
   c. first circuit means for applying said first output control signal as one input signal to said NOR gate;
   d. an inverter for inverting said first output control signal and providing an inverted first output control signal;
   e. bistable means for receiving said second output control signal and said inverted first output control signal for providing a third output control signal, said third output control signal normally being at a first binary level when said inverted first output control signal changes from a first to a second binary level, said third output control signal being prevented from changing to a first binary level in response to said inverted first output control signal changing to a second binary level by said second output control signal changing from a second binary level to a first binary level while said inverted first output control signal is at a first binary level; and
   f. second circuit means for applying said third output control signal as a second input signal to said NOR gate.

14. A pulse height analyzer for providing an output signal in response to an input signal, having a maximum amplitude lying between predetermined lower and upper amplitude levels, the circuit comprising:
   a. first and second comparator means responsive to said input signal for respectively providing first and second output control signals that are low when said input signal amplitude exceeds said lower and upper levels, respectively;
   b. a NAND gate for receiving two input signals, providing a high output signal when at least one of said input signals is low, and providing a low output signal when both of said input signals are high;
   c. first connecting means for providing said first output control signal as one input signal to said NAND gate;
   d. bistable means for receiving said first and second output control signals and providing a third output control signal, said third output control signal normally being high when said first output control signal goes from low to high, said third output control signal being prevented from going high in response to said first output control signal going high by said second output control signal going low and then high while said first output control signal is low; and
   e. second connecting means for providing said third output control signal as a second input signal to said NAND gate.

* * * * *